(12) United States Patent
Kim

(10) Patent No.: US 9,609,801 B2
(45) Date of Patent: Apr. 4, 2017

(54) HAND SEED PLANTER WITH SOIL-REMOVING FEATURE

(71) Applicant: Soon Bae Kim, Kangwon-do (KR)

(72) Inventor: Soon Bae Kim, Kangwon-do (KR)

( * ) Notice: Subject to any disclaimer, the term of this patent is extended or adjusted under 35 U.S.C. 154(b) by 0 days.

(21) Appl. No.: 14/652,926

(22) PCT Filed: Dec. 12, 2013

(86) PCT No.: PCT/KR2013/011537
§ 371 (c)(1),
(2) Date: Jun. 17, 2015

(87) PCT Pub. No.: WO2014/098412
PCT Pub. Date: Jun. 26, 2014

(65) Prior Publication Data
US 2015/0327432 A1     Nov. 19, 2015

(30) Foreign Application Priority Data

Dec. 18, 2012   (KR) ........................ 10-2012-0148170

(51) Int. Cl.
| | |
|---|---|
| A01C 5/02 | (2006.01) |
| A01C 7/02 | (2006.01) |
| A01C 7/00 | (2006.01) |
| A01C 15/02 | (2006.01) |
| A01B 1/20 | (2006.01) |
| A01C 14/00 | (2006.01) |
| A01G 25/14 | (2006.01) |

(52) U.S. Cl.
CPC .................. *A01C 5/02* (2013.01); *A01B 1/20* (2013.01); *A01C 7/002* (2013.01); *A01C 7/02* (2013.01); *A01C 14/00* (2013.01); *A01C 15/02* (2013.01); *A01G 25/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,170,422 A | * | 2/1965 | Gregory ................... | A01O 5/02 111/96 |
| 5,325,798 A | * | 7/1994 | Nowell ..................... | A01O 5/02 111/92 |
| 5,622,122 A | * | 4/1997 | Adair ....................... | A01O 5/04 111/100 |

(Continued)

FOREIGN PATENT DOCUMENTS

| | | | | | |
|---|---|---|---|---|---|
| FR | | 770940 A | * | 9/1934 | ............... A01C 5/02 |
| FR | | 2990324 A1 | * | 11/2013 | ............... A01C 5/02 |

(Continued)

*Primary Examiner* — Alicia Torres
(74) *Attorney, Agent, or Firm* — IPLA P.A.; James E. Bame

(57) ABSTRACT

A seed planter capable of removing soil, which is capable of: forming holes in which seeds can be planted by applying downward pressure to soil furrows covered by vinyl and by removing the covered vinyl and soil all at once, and at the same time inserting a supply pipe into the formed holes such that the seeds, water, and a fertilizer can be selectively placed therein; enables the removed covered vinyl at a fixing pin and within a needle member; and has a measuring tape such that holes can be precisely formed at proper intervals for growing plants.

8 Claims, 10 Drawing Sheets

(56) References Cited

U.S. PATENT DOCUMENTS

| | | | | |
|---|---|---|---|---|
| 7,913,633 B2 * | 3/2011 | Stewart | ................... | A01O 5/02 111/92 |
| 2009/0120655 A1 * | 5/2009 | Hansen | ................... | A01O 5/02 172/19 |

FOREIGN PATENT DOCUMENTS

| | | | | |
|---|---|---|---|---|
| GB | 350301 A | * | 6/1931 | ............... A01C 7/02 |
| JP | 09-313014 | | 12/1997 | |
| KR | 2019870011740 | | 8/1987 | |
| KR | 2019880015522 | | 10/1988 | |
| KR | 1007942590000 | | 1/2008 | |
| KR | 1020080082044 | | 9/2008 | |

\* cited by examiner

HAND SEED PLANTER WITH SOIL-REMOVING FEATURE

BACKGROUND

The present invention relates to a seed planter capable of removing soil, and in particular to a seed planter capable of removing soil wherein holes through which seed can be planted are formed while removing a vinyl and soil at a time by providing a downward pressure to soil furrows covered by a vinyl, and a supply tube is inserted into the thusly formed holes, and seed, water and fertilizer can be selectively inputted. In this way, a worker can work conveniently for long time in a posture where a worker's back is not bent, thus reducing working time and increasing a labor efficiency. Since the removed wrapping vinyl can be sequentially collected, a post-work process becomes easy, and since a tape measure is provided, the holes through which plants can grown well can be accurately formed at appropriate intervals.

In a conventional technology, when doing a seedling planting work, holes are formed at a warping vinyl covering furrows, and holes are formed using a hoe in soil through the holes formed in the vinyl, and a seedling is planted into the holes and is covered with soil by hoeing near soil.

However, the above seedling planting work needs a lot of processes requiring various tools. Moreover, a worker should form holes with his eye measurement or a separate measure, for example, a tape measure, which causes a lot of inconveniences.

During all the works, for example, hole formation, seed planting, watering and fertilizing, a worker should repeat sitting and standing up actions for long time, so the worker easily gets tired, and work efficiency is very bad.

SUMMARY OF THE INVENTION

Accordingly, it is an object of the present invention to provide a seed planter capable of removing soil wherein holes through which seed can be planted are formed while removing a vinyl and soil at a time by providing a downward pressure to soil furrows covered by a vinyl, and a supply tube is inserted into the thusly formed holes, and seed, water and fertilizer can be selectively inputted. In this way, a worker can work conveniently for long time in a posture where a worker's back is not bent, thus reducing working time and increasing a labor efficiency. Since the removed wrapping vinyl can be sequentially collected, a post-work process becomes easy, and since a tape measure is provided, the holes through which plants can grown well can be accurately formed at appropriate intervals.

To achieve the above object, there is provided a seed planter capable of removing soil which includes, but is not limited to, a body which has a hollow interior and is formed in a cylindrical shape both ends of which are open, wherein a handle is detachably engaged to an upper side of the body, and a cylinder having an inner diameter expanding to accommodate wrapping vinyl and soil is provided at a lower side of the body, and an engaging ring is provided at the upper and lower sides of the body; a vertical moving member which is disposed vertically movable inside the body and is elastically biased upward, wherein an upper end of the vertical moving member is exposed to an upper, outer side of the body, and a lower end thereof is accommodated in the inside of the cylinder, and the lower end thereof elastically comes and goes toward the lower outer side of the cylinder depending on the pressing on the upper end side thereof; a counting member which is installed on the body and is connected with the vertical moving member, thus counting the number that the vertical moving member vertically moves; a supply tube member which is disposed selectively passing through the engaging ring, thus providing a selective supply of seeds, water or fertilizer, wherein the inside of the supply tube member is hollow, and the supply tube member is formed in a cylindrical shape both ends of which are open; a tape measure which is provided at a lower side of the body and comes and goes in the direction which is horizontal with the ground; and a needle member for collecting vinyl, which is disposed spaced a predetermined distance from a side surface of the body, wherein the lower side of the needle member is fixed at the lower side of the body, and the upper side thereof is detachably fixed at the upper side of the body.

According to an exemplary feature of the present invention, an edge of the cylinder is formed sharp to cut the wrapping vinyl.

According to an exemplary feature of the present invention, the vertical moving member may include, but is not limited to, a linear rod which is accommodated in the inside of the body; a piston which is fixed at a lower end of the rod and has an inwardly concave groove and is accommodated inside the cylinder; a fixing pin which protrudes downward from the lower end of the piston and first collects the wrapping vinyl which is cut by the cylinder and is passed through the fixing pin; a support protrusion which protrudes from both front ends of the fixing pin 25 and supports the wrapping vinyl which is passed through and first collected by the fixing pin, thus preventing the collected wrapping vinyl from separating; and a first spring member which is interposed between the piston and the cylinder and elastically biases downward the piston.

According to an exemplary feature of the present invention, the counting member is connected through a wire to a pin member which is detachably engaged to the vertical moving member through a through slit formed in the longitudinal direction at the body, thus mechanically counting the number of the vertical movements with the aid of the wire which is pulled when the vertical moving member descends.

According to an exemplary feature of the present invention, the needle member is disposed spaced a predetermined distance from the body to be parallel with the body, wherein the lower end of the needle member is bend toward the body and is fixedly engaged, and the upper end thereof is selectively engaged to or separates from a fixing clip disposed at the body, and the top of the needle member is formed sharp for the wrapping vinyl to pass through, thus second collecting the wrapping vinyl which has been collected in the fixing pin.

According to an exemplary feature of the present invention, a support member is provided on the vertical moving member which is exposed to an upper outer side of the body, and a second spring member is interposed between the upper end surface f the body and the lower end surface of the support member for elastically biasing upward the vertical moving member.

According to an exemplary feature of the present invention, at the vertical moving member which is exposed to the upper outer side, there is provided a rope member fixed at the handle of one side so as to fix the descended state of the vertical moving member, and a shoulder band having a fixing hook at its both ends is further provided, wherein the position of the vertical moving member is fixed using the rope member, and then the worker puts on the seed planter so as to remove the wrapping vinyl first collected in the cylinder in a state that the fixing hooks of both sides are selectively fixed at the seed planter.

According to an exemplary feature of the present invention, a hose member of a portable water tank that a worker can wear on his back is connected to the top of the supply tube member, thus supplying water through the hose member depending on the control of the valve.

First, the seed planter capable of removing soil according to an exemplary embodiment of the present invention is able to provide advantageous effects in the way that holes through which seed can be planted are formed while removing a vinyl and soil at a time by providing a downward pressure to soil furrows covered by a vinyl, and a supply tube is inserted into the thusly formed holes, and seed, water and fertilizer can be selectively inputted. In this way, a worker can work conveniently for long time in a posture where a worker's back is not bent, thus significantly reducing working time and increasing a labor efficiency.

Second, it is advantageous that since the removed wrapping vinyl can be sequentially collected, a post-work process becomes easy, and since a tape measure is provided, the holes through which plants can grown well can be accurately formed at appropriate intervals.

DETAILED DESCRIPTION OF THE INVENTION

Figure 1:
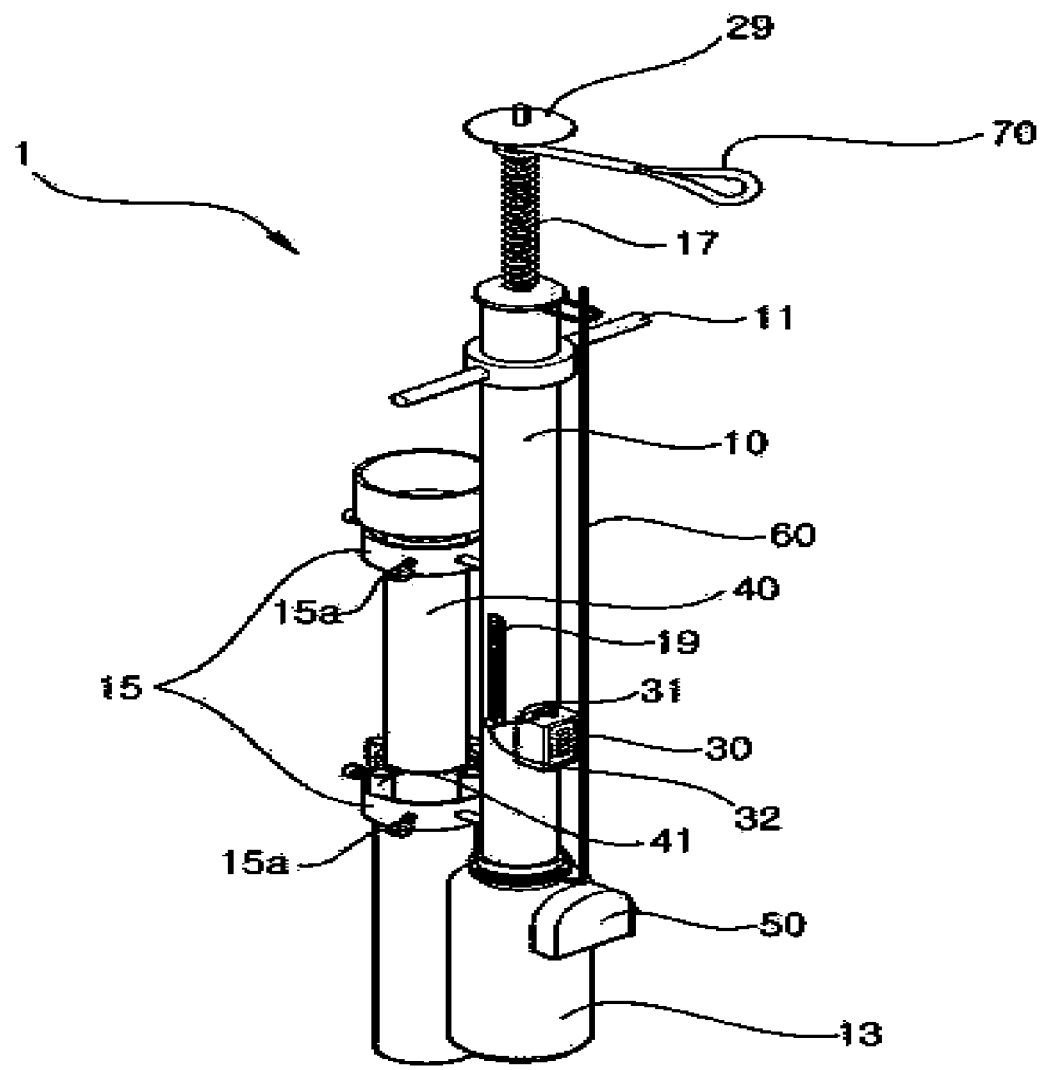
FIG. 1 is a perspective view illustrating a seed planter capable of removing soil according to an exemplary embodiment of the present invention.
Figure 2:
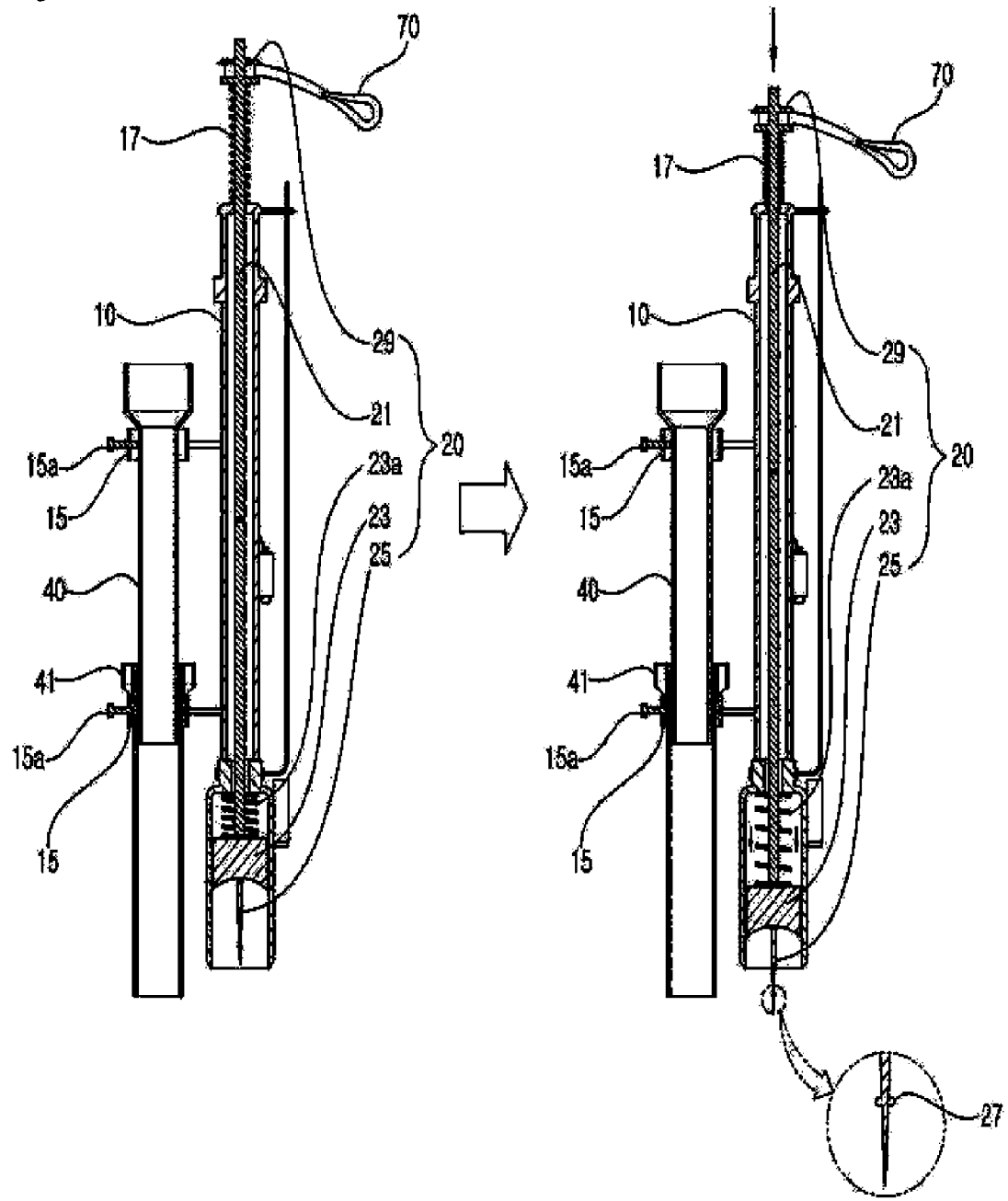
FIG. 2 is a cross sectional view for describing an operation of a seed planter capable of removing soil according to an exemplary embodiment of the present invention.
Figure 3:
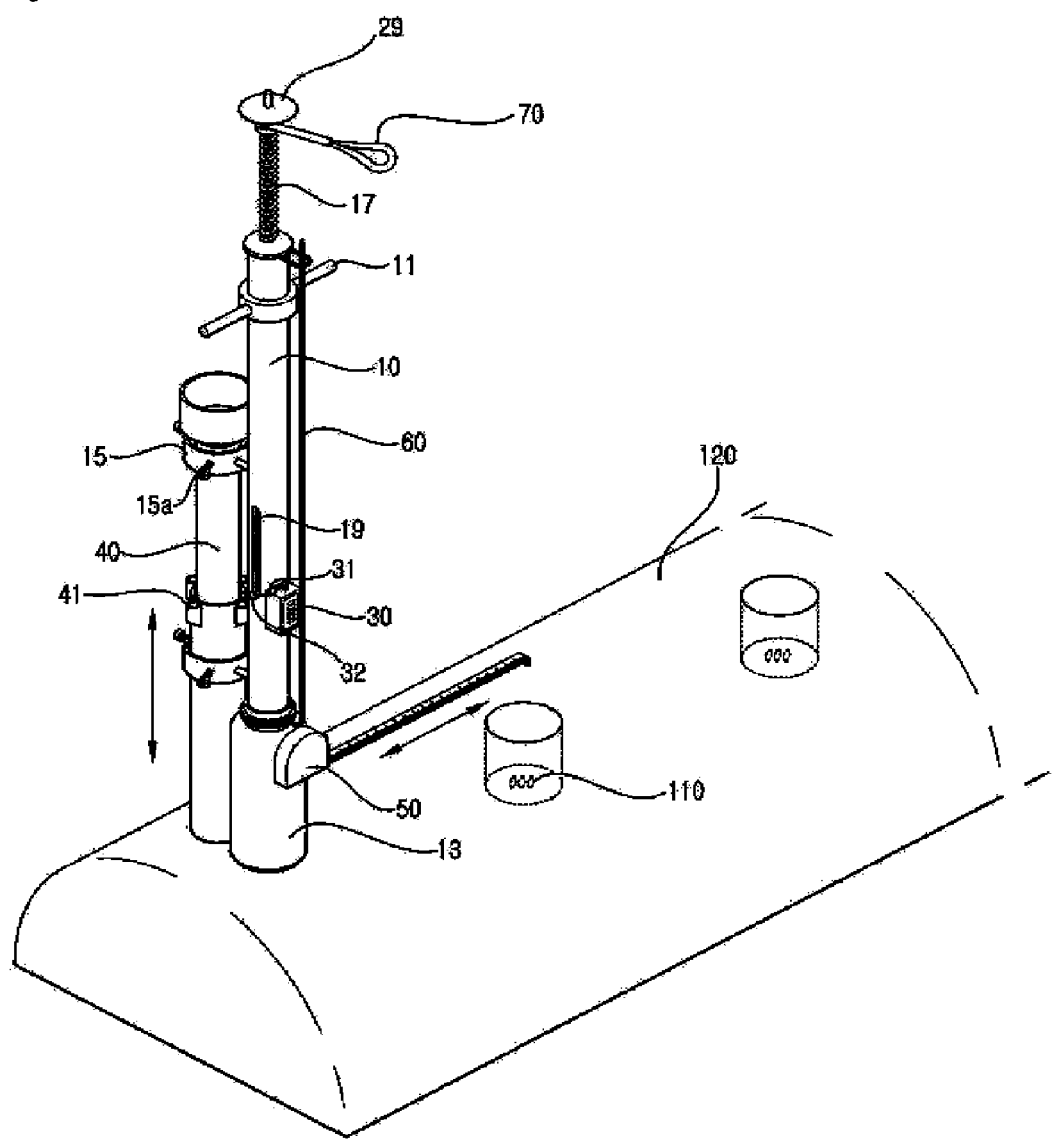
FIGS. 3 to 5 are views for describing an operation of a seed planter capable of removing soil according to an exemplary embodiment of the present invention.
Figure 4:
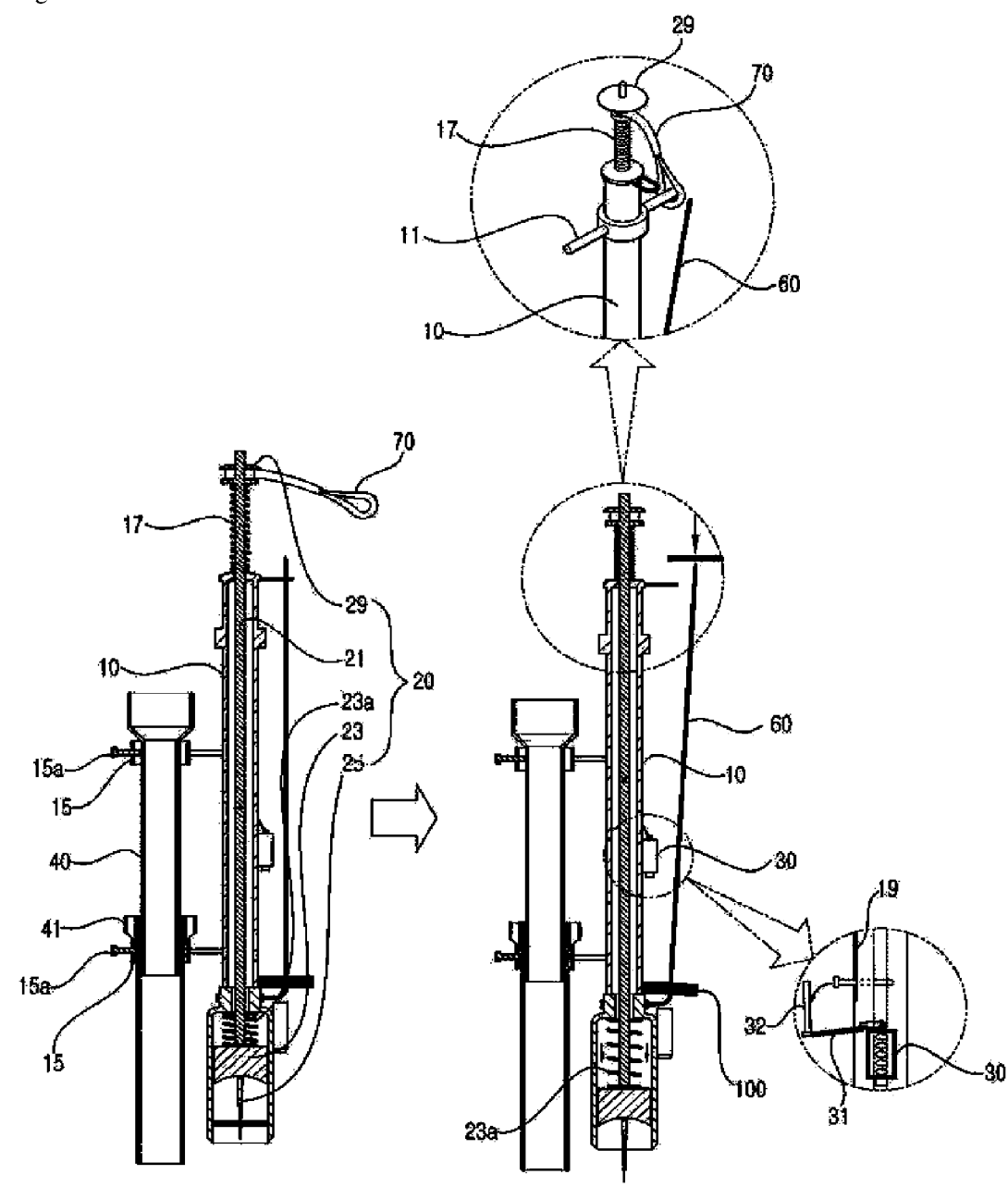
Figure 5:
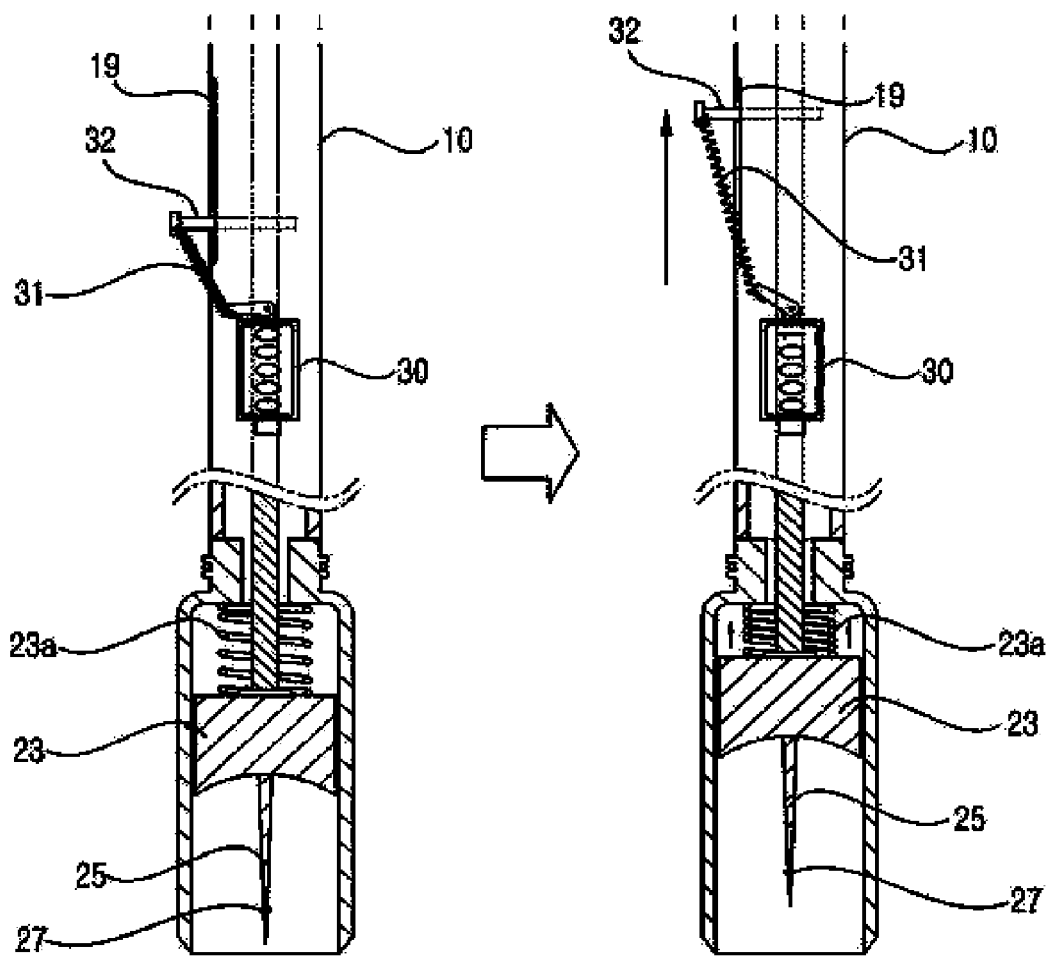
Figure 6A:
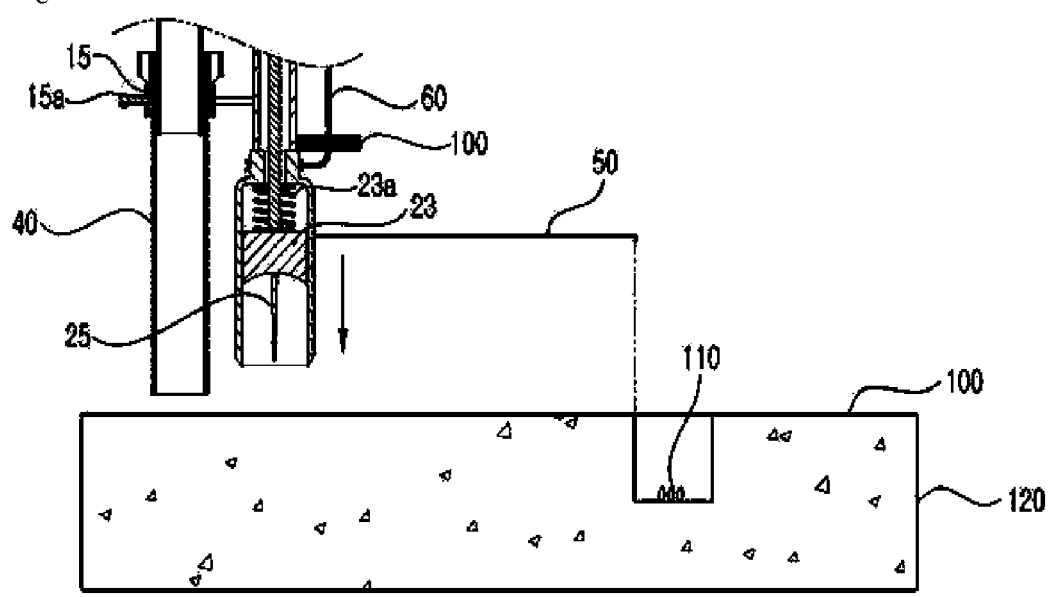
FIGS. 6A to 6G are views for describing the states of uses of a seed planter capable of removing soil according to an exemplary embodiment of the present invention.
Figure 6B:
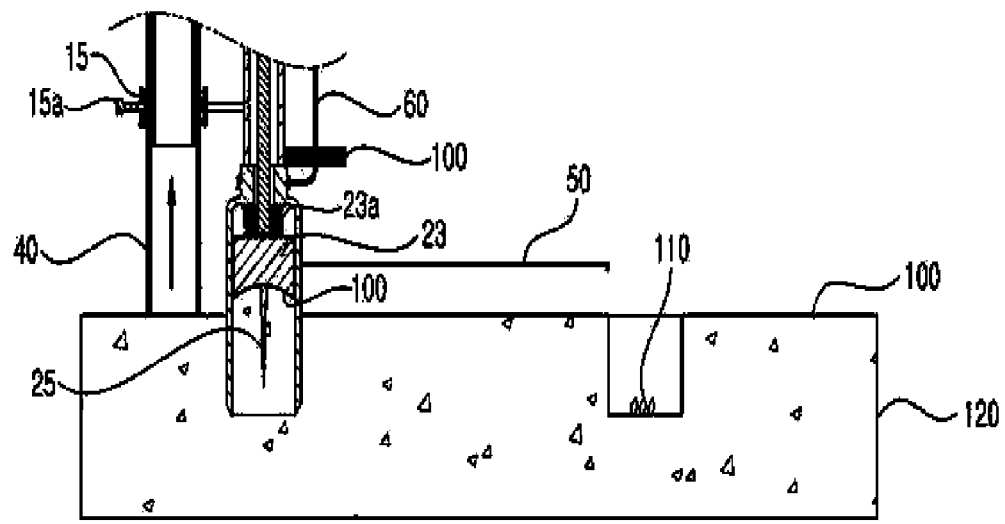
Figure 6C:
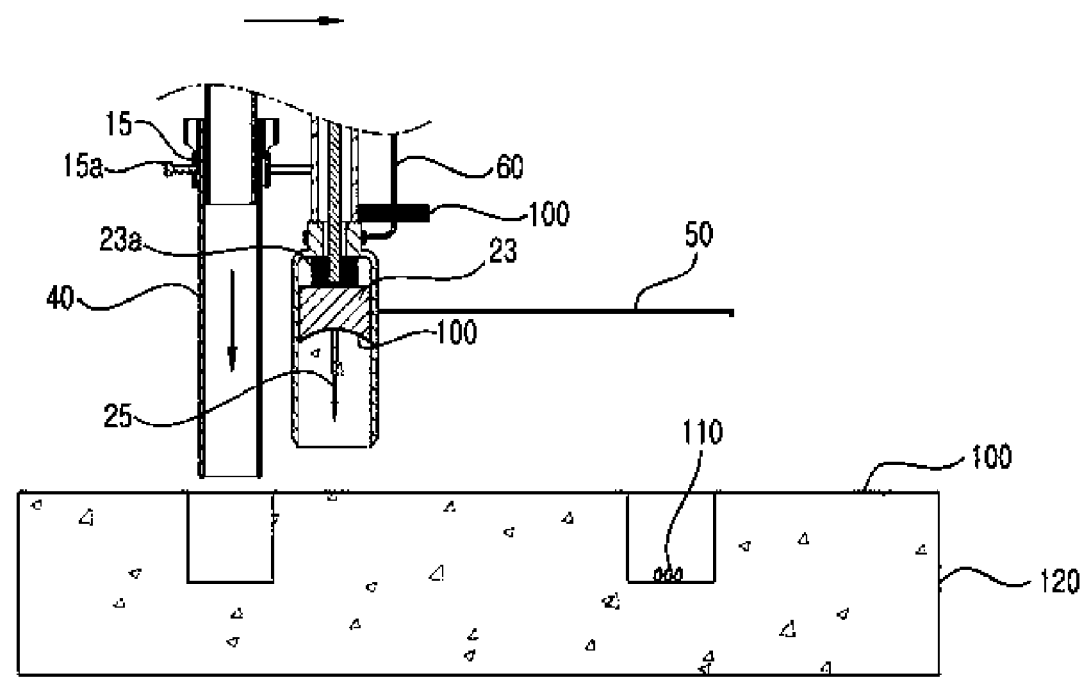
Figure 6D:
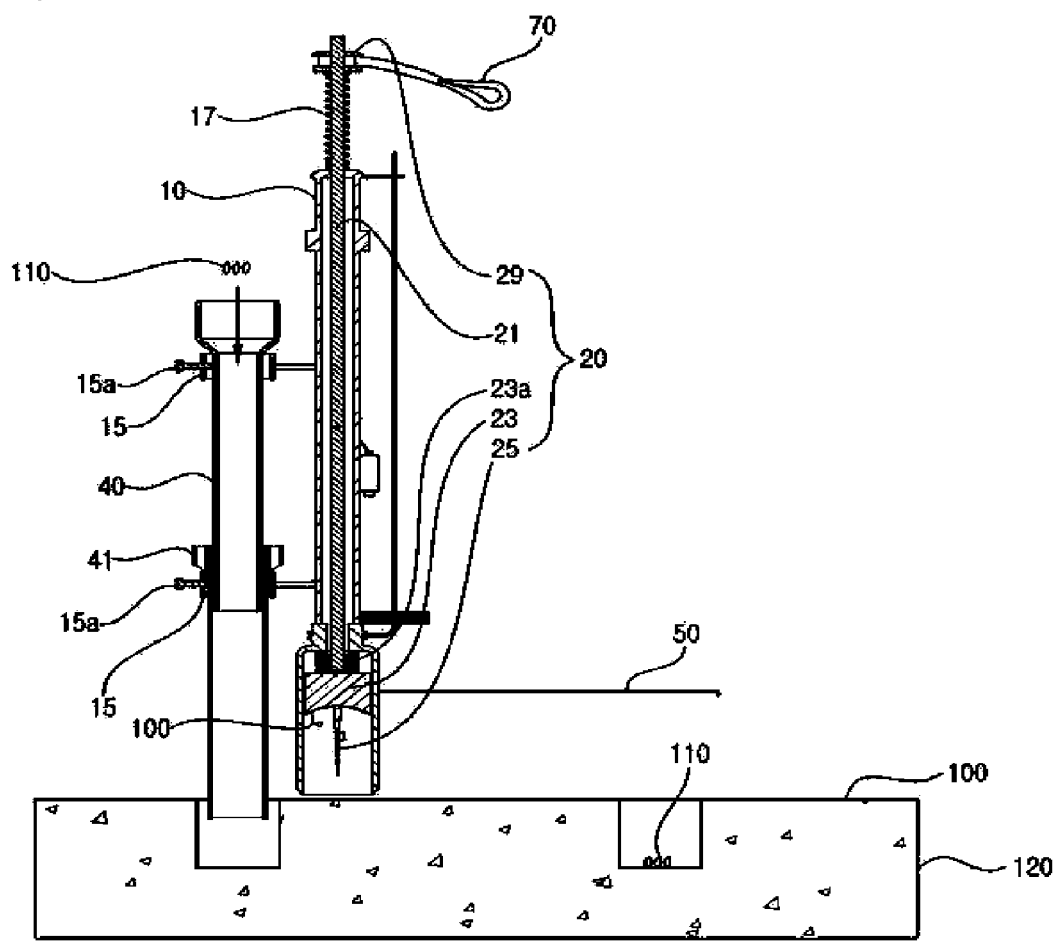
Figure 6E:
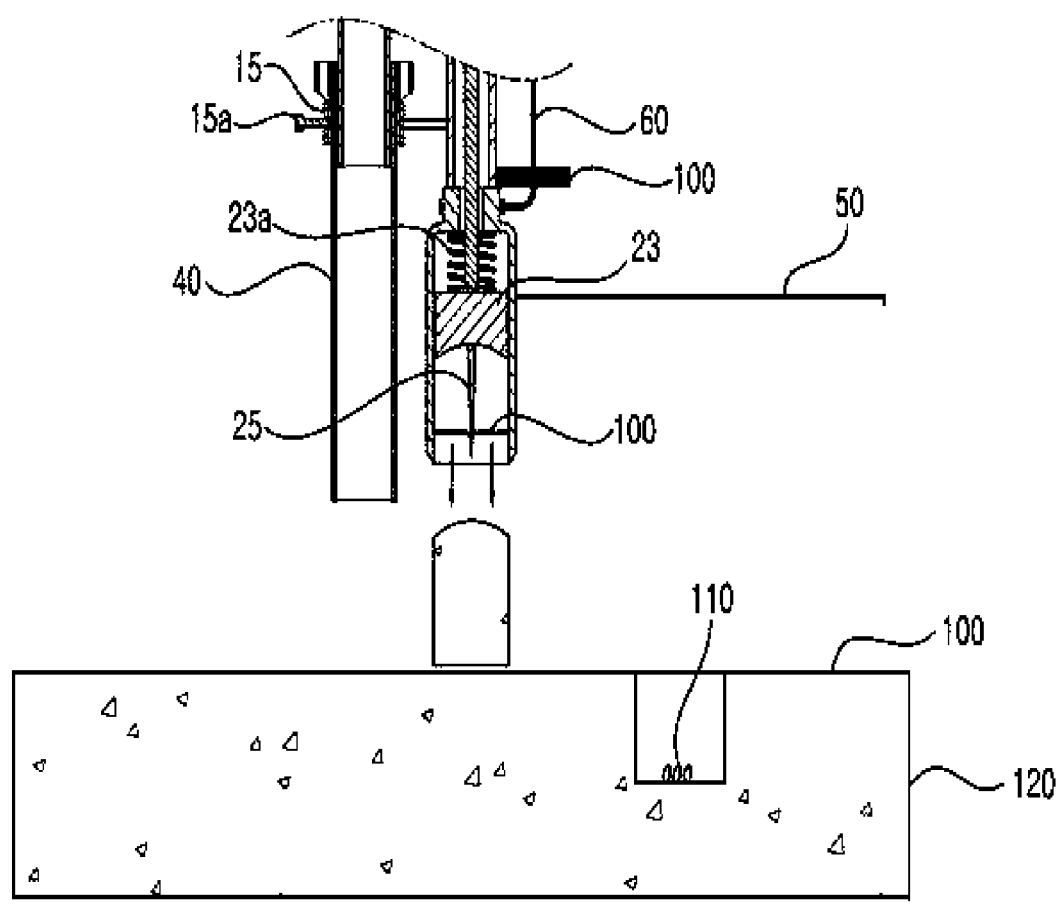
Figure 6F:
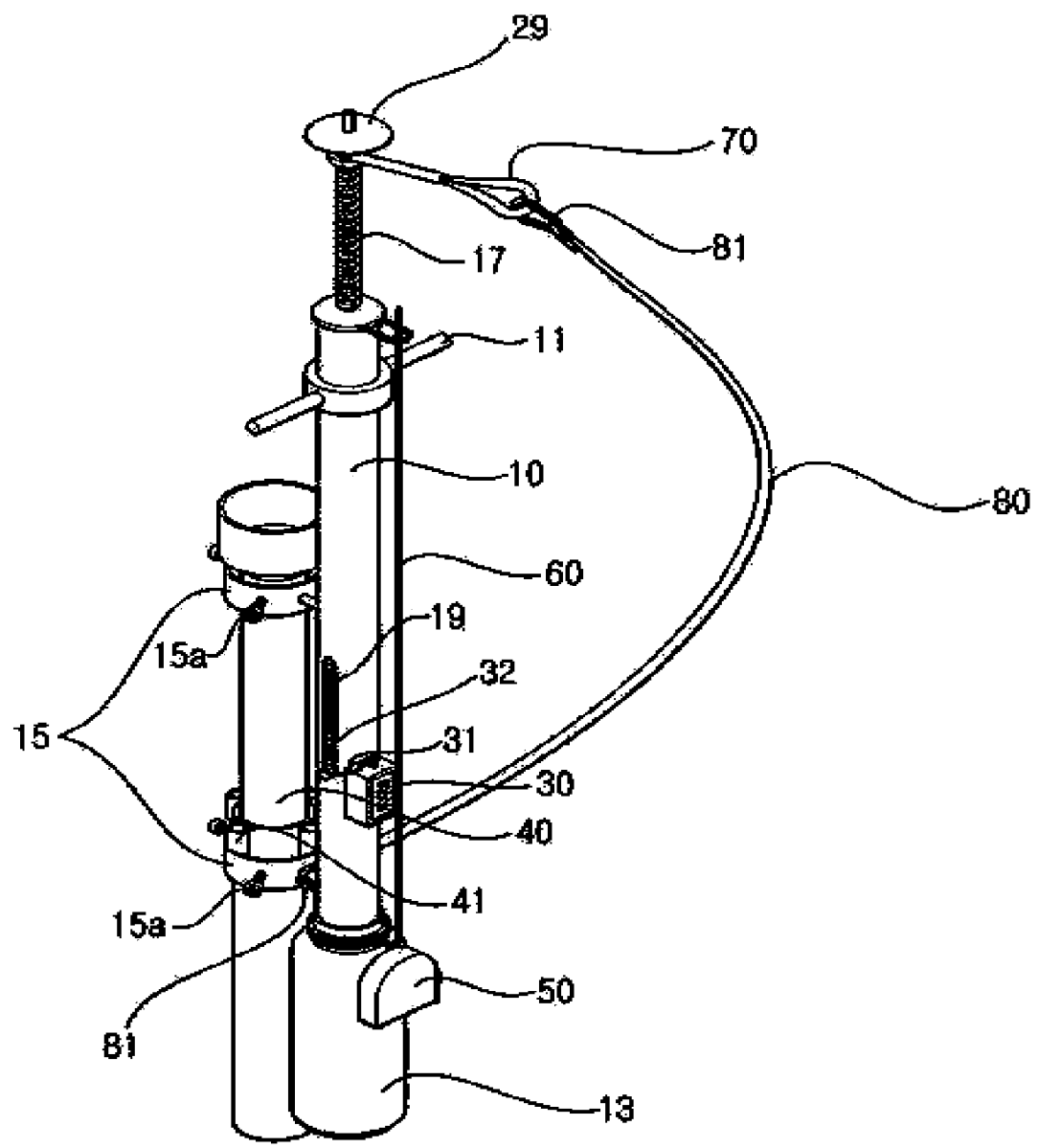
Figure 6G:
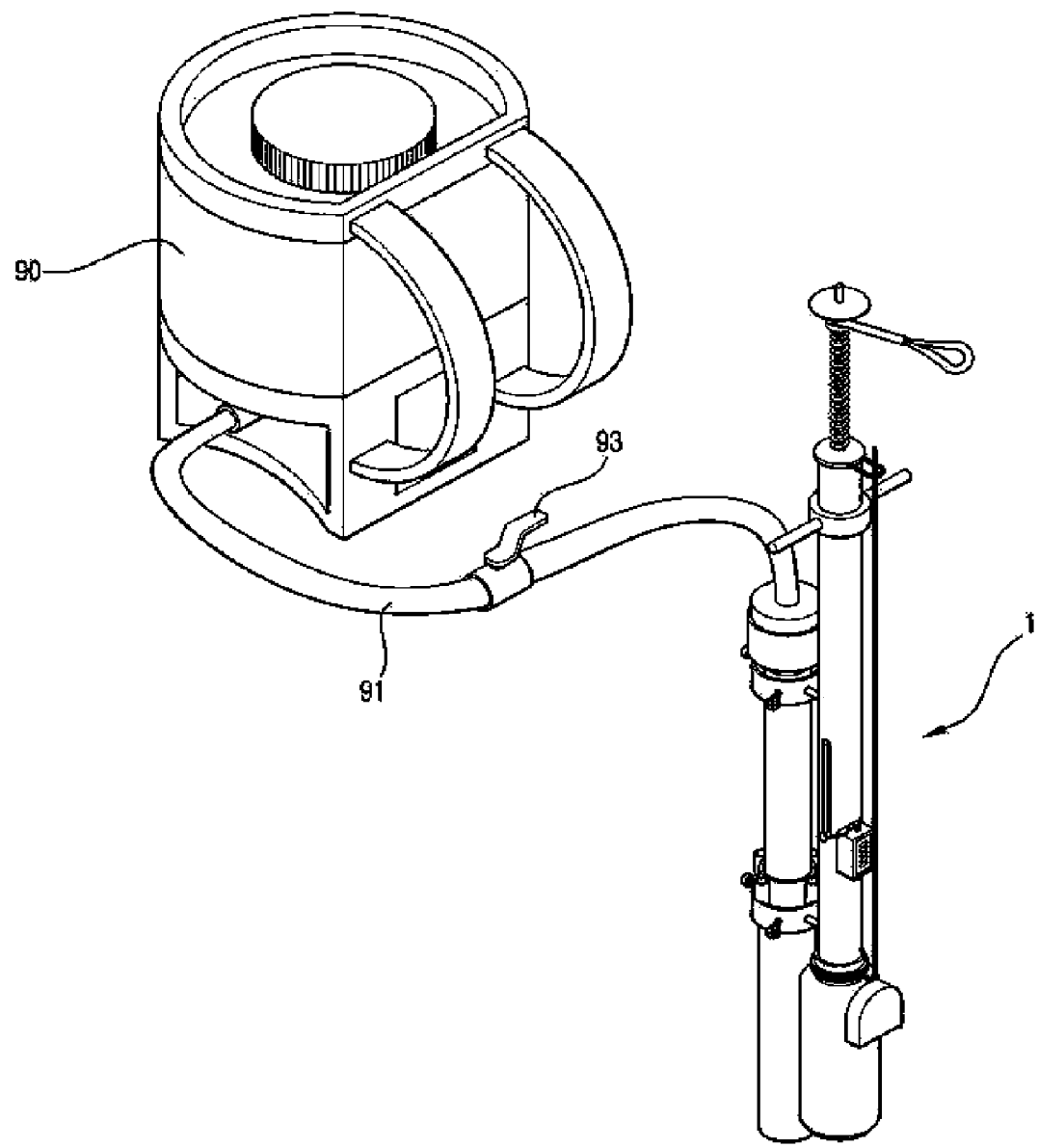

FIG. 1 is a perspective view illustrating a seed planter capable of removing soil according to an exemplary embodiment of the present invention. FIG. 2 is a cross sectional view for describing an operation of a seed planter capable of removing soil according to an exemplary embodiment of the present invention. FIGS. 3 to 5 are views for describing an operation of a seed planter capable of removing soil according to an exemplary embodiment of the present invention. FIGS. 6A to 6G are views for describing the states of uses of a seed planter capable of removing soil according to an exemplary embodiment of the present invention.

The seed planter 1 capable of removing soil according to an exemplary embodiment of the present invention may include, but is not limited to, a body which has a hollow interior and is formed in a cylindrical shape both ends of which are open, wherein a handle 11 is detachably engaged to an upper side of the body, and a cylinder 13 having an inner diameter expanding to accommodate wrapping vinyl 100 and soil is provided at a lower side of the body, and an engaging ring 15 is provided at the upper and lower sides of the body 10; a vertical moving member 20 which is disposed vertically movable inside the body 10 and is elastically biased upward, wherein an upper end of the vertical moving member 20 is exposed to an upper, outer side of the body 10, and a lower end thereof is accommodated in the inside of the cylinder 13, and the lower end thereof elastically comes and goes toward the lower outer side of the cylinder 13 depending on the pressing on the upper end side thereof; a counting member 30 which is installed on the body 10 and is connected with the vertical moving member 20, thus counting the number that the vertical moving member 20 vertically moves; a supply tube member 40 which is disposed selectively passing through the engaging ring 15, thus providing a selective supply of seeds, water or fertilizer, wherein the inside of the supply tube member 40 is hollow, and the supply tube member 40 is formed in a cylindrical shape both ends of which are open; a tape measure 50 which is provided at a lower side of the body 10 and comes and goes in the direction which is horizontal with the ground; and a needle member 60 for collecting vinyl, which is disposed spaced a predetermined distance from a side surface of the body 10, wherein the lower side of the needle member 60 is fixed at the lower side of the body 10, and the upper side thereof is detachably fixed at the upper side of the body 10.

Hereinafter, the components and operations of the seed planter capable of removing soil according to an exemplary embodiment of the present invention will be described with reference to the accompanying drawings.

Here, the body 10 forms the whole outer appearance of a seed planter 1 and is configured to play a role of accommodating components which will be described later and is formed in a cylindrical shape. When in use, the body 10 maintains upright on the ground.

The body 10 has a hollow inside, and both ends of the body 10 are formed in open cylindrical shapes. A handle 11 is detachably engaged to the top of the body 10, and at the bottom thereof, there are provided a wrapping vinyl 100, and a cylinder 13 having a predetermined inner diameter which expands to accommodate soil. An engaging ring 15 is formed at the upper and lower sides of the body 10.

The handle 11 protrudes at both upper sides of the body 10 for a user to grab and is thread-engaged for the sake of selective separation. Here, the handle 11 allows a worker to grab and enables the cylinder 13 to press the soil, and a rope member 70 may be fixedly inserted into the handle 11.

The cylinder 13 communicates with the body 10, and both ends of the cylinder 13 are open to allow a vertical moving member 20 to come and go, and the inside of the cylinder 13 is hollow, and the inner diameter of the cylinder 13 expands more than the body 10. At this time, the inner diameter of the cylinder 13 allows to determine the size of the hole formed in soil. It is preferred that one of the cylinders 13 having various sizes can be selectively engaged to the bottom of the body 10. At this time, an engaging method of the body 10 and the cylinder 13 may be a known method selected among a thread engagement, a press fitting method, etc. An edge portion of the cylinder 13 is formed sharp to cut the wrapping vinyl 100 and at the same time to easily accommodate soil.

The engaging ring 15 is configured for a supply tube member 40 to be inserted into the engaging ring 15. The engaging ring 15 is provided at the upper side and the lower side, respectively, in the same direction so that the supply tube member 40 can be vertically inserted, wherein the engaging rings 15 are connected. In addition, a tightening screw 15a, which can come and go based on the tightening, is provided at each engaging ring 15, so the supply tube member 40 inserted into the inside can be fixed based on the tightening. The supply tube member 40 can be formed as a tube, but may be formed as a double pipe. In this case, the supply tube member 40 of the upper side may be fixed to the engaging ring 15 of the lower side using a tightening screw 15a, and the supply tube member 40 of the lower side is disposed movable in the engaging ring 15 of the upper side, not fixed by the tightening screw 15a. When the cylinder 13 of the body 10 moves into the soil, the supply tube member 40 of the lower side is pushed in the engaging ring 15 of the lower side by the soil toward the upper side, and after the formation of the holes are finished, and the body 10 is lifted up, the supply tube member 40 returns back to its initial position by its self-weight. An engaging protrusion 41 is formed protruding from an outer circumferential portion of the supply tube member 40 so as to prevent a separation of the supply tube member from the engaging ring 15, wherein the engaging protrusion 41 is supported by the top of the engaging ring 15 of the lower side. The above-described engaging ring 15 may be exchanged with an engaging ring 15 selected based on the size of the supply tube member 40.

Meanwhile, the vertical moving member 20 is disposed vertically movable in the inside of the body 10. When the piston 23 presses the soil, the vertical moving member 20 moves upward, and when it is pressed downward by the user, the piston 23 accommodated in the inside of the cylinder 13 exposes to the outside of the cylinder 13, which allows the soil accommodated in the cylinder 13 to discharge to the outside. The vertical moving member 20 allow to remove the wrapping vinyl 100 from the fixing pin 25 when the wrapping vinyl 100 gathers by a predetermined amount.

The vertical moving member 20 may include, but is not limited to, a linear rod 21 accommodated in the inside of the body 10, a piston 23 which is fixed at a lower end of the rod 21 and has an inwardly concave groove and is accommodated inside the cylinder 13, a fixing pin which protrudes downward from the lower end of the piston 23 and first collects the wrapping vinyl 100 which is cut by the cylinder 13 and is passed through the fixing pin, a support protrusion 27 which protrudes from both front ends of the fixing pin 25 and supports the wrapping vinyl 100 which is passed through and first collected by the fixing pin 25, thus preventing the collected wrapping vinyl from separating, and a first spring member which is interposed between the piston and the cylinder and elastically biases downward the piston.

The vertical moving member 20 is disposed vertically movable inside the body 100 and is elastically biased downward by a first spring member 23a and is elastically supported upward by a second spring member 17. Namely, when the user presses the portion of the cylinder 13 toward the soil so as to form the holes at the soil furrow 120, the piston 23 inside the cylinder 13 is pushed upward by the soil. At this time, the first spring member 23a contracts, and part of the soil is filled in the inside of the cylinder 13. When the formation of the holes are finished, and the cylinder 13 is moved out of the soil, the first spring member 23a, which has contracted, returns back to its initial shape, and the piston 23 is elastically biased downward.

The upper side of the vertical moving member 20 exposes to the upper outer side of the body 10, and the lower side of the vertical moving member 20 elastically comes and goes by the second spring member 17 toward the lower outer side of the cylinder depending on the pressing of the user. Namely, if the rod 21 exposed to the upper outer side of the body 10 is pressed downward, the piston 23 fixed at a lower end of the rod 21 is exposed to the outside through the lower side of the cylinder 13, and a plurality of wrapping vinyl 100 cut by the cylinder 13 are first stacked and collected by means of the fixing pin 25. At this time, referring to FIG. 4, it needs to separate the pin member 32 from the vertical moving member 20 so as to move the vertical moving member 20 downward. In addition, the wrapping vinyl 100 collected by the fixing pin 25 are not randomly separated from the fixing pin 25 by means of the support protrusion 27.

In addition, a circular plate-shaped support member 29 corresponding to the shape of a horizontal cross section of the body 10 is provided at the vertical moving member 20 which is exposed to the upper outer side of the body 10. A second spring member 17 is interposed between the upper end surface of the body 10 and the lower end surface of the support member 29 so as to elastically bias upward the vertical moving member 20.

In addition, at the vertical moving member 20 which is exposed to the upper outer side, there is provided a rope member 70 fixed at the handle 11 of one side so as to fix the downwardly descended position of the vertical moving member 20, and a shoulder band member 80 is further provided, wherein a fixing hook 81 is disposed at both ends of the fixing hook 81. The position of the vertical moving member 20 is fixed using the rope member 70. The worker can put on the seed planter 1 in a state where the fixing hooks 81 of both sides are selectively fixed at the seed planter 1 when it need to remove the wrapping vinyl 100 which has been first collected in the cylinder 13. Namely, in a state where the vertical moving member 20 has descended, the vertical moving member 2 tends to move upward by the second spring member 17. The state where the vertical moving member 20 has descended, namely, the state where the piston 23 fixed at the lower end of the rod 21 has been exposed to the outside through the bottom of the cylinder 13 can be fixed in such a way to fixedly insert the rope member 70 into the handle 11 of one side. At this time, the workers can put on the seed planter 1 after fixing the fixing hook 81 at one side of each of the upper and lower sides of the body 10, thus removing the wrapping vinyl 100 which has been first collected at the side of the fixing pin 25.

A counting member 30 is installed on the body 10. The counting member 30 is configured to count the number that the vertical moving member 20 has moved vertically, so the worker can know how many holes he has made and how much seeds he has planted.

The counting member 30 is connected through a wire 31 to a pin member 32 which is engaged detachable to the vertical moving member 20, thus counting the number that the vertical moving member 20 has moved vertically. For this, the counting member is connected through the wire 31 to the pin member 32 which is engaged detachable to the vertical moving member 20 through a through slit 19 formed in the longitudinal direction at the body 10, thus mechanically counting the number of the vertical movements with the aid of the wire 31 which pulls when the vertical moving member 20 ascends. The above-described counting member 30 is the same as the conventional counting device, so the detailed description thereof will be omitted for simplification.

Meanwhile, the supply tube member 40 selectively passes through the engaging rings of the upper and lower sides. The supply tube member 40 are inserted into the holes formed by the body 10, so seed 110, water, fertilizer, etc. can be supplied through the inside of the supply tube member 40. For this, the inside of the supply tube member 40 is hollow and is formed in a cylindrical shape both ends of which are open. Multiple supply tube units may be provided for the inputs of seeds, water, fertilizer or the like or only supply tube unit may be provided.

In addition, when supplying water, a hose member of a portable water tank 90 that a worker can put on during work may be connected to the top of the water supply tube 40. The supply of water from the hose member 91 to the supply tube member 40 can be performed by controlling a valve 93 provided at one side of the hose member.

Meanwhile, at one lower side of the body 10, there is provided a tape measure member 50 which comes and goes in the direction the tape measure 50 is horizontal with respect to the ground. The tape measure 50 provides the intervals at which the holes are formed. If the interval at which the holes are formed is 40 cm, the tape measure of the tape measure member 50 is withdrawn by 40 cm and is fixed, so the worker can make holes at accurate intervals while confirming the intervals.

In addition, a needle member 60 is disposed spaced a predetermined distance from a side surface of the body 10. The needle member 60 serves to second collect the wrapping vinyl 100 which has been collected by the fixing pin 25. The lower side of the needle member 60 is fixed at a lower side of the body 10, and the upper side thereof is fixed detachable at the upper side of the body 10.

Namely, the needle member 60 is disposed spaced a predetermined distance from the body 10 in parallel with the body 10, and the lower side of the needle member 60 is bent toward the body 10 and is fixedly engaged, and the upper side thereof is selectively fixed at or separates from a fixing clip 51 provided at the body 10. The top of the needle member 60 is formed sharp for the wrapping vinyl to pass through, so the wrapping vinyl 100 and 60 collected by the fixing pin 25 can be second collected.

The operations of the seed planter 1 capable of removing vinyl according to an exemplary embodiment of the present invention will be described with reference to FIG. 6A to FIG. 6G.

First, the worker withdraws a tape measure from the tape measure member 50 by the intervals at which the holes are formed and fixes it. Next, the cylinder 13 is positioned where the holes will be formed. Here, the body 10 remains vertical with respect to the ground, and the worker is holding the handles 11 with both hands.

The worker who is holding the handles 11 presses the body 10 downward using his weight and forms the holes at the soil furrows 120. At this time, the piston 23 in the cylinder 13 ascends, and the number of the holes formed is counted by the counting member 30, and the cut wrapping vinyl 100 and soil are accommodated in the inside, and at the same time, the supply tube member 40 positioning in the engaging ring 15 is pressed by the ground and naturally ascends upward. After the formation of the holes are finished, the supply tube member 40 returns back to its initial position, and the piston 23 returns back to its initial position by the first spring member 23a while discharging the soil filled in the inside. If the discharge of the soil is not good, the worker may lightly touch with his foot the cylinder 13 for reliable discharge or may separate the pin member 32 and moves downward the vertical moving member 20 so as to forcibly discharge the soil with the aid of the piston 23. In addition, the wrapping vinyl 100 accommodated in the cylinder 13 is passed through by the fixing pin 25 and is first collected, and the collected wrapping vinyl 100 cannot be randomly separated from the fixing pin 25 with the aid of the support protrusion 27 protruding from the front end of the fixing pin 25.

Next, the lower end of the supply tube member 40 is inserted into the hole formed at the soil furrow 120, and the seeds 110, fertilizer, water, etc. is selectively supplied.

The worker can repeatedly perform the above procedure, thus easily forming the holes. When the wrapping vinyl 100 is collected in the fixing pin 25 by a predetermine amount, the pin member 32 is separated, and the vertical moving member 20 is downwardly moved, and the rope member 70 is inserted into the handle 11 of one side, and the position of the vertical moving member 20 is fixed, and the fixing pin 25 is exposed to the lower side of the cylinder 13, and then the worker puts on the seed planer 1 using the shoulder band 80. Next, the wrapping vinyl 100 is separated from the fixing pin 25, and the needle member 60 at an outer side of the body 10 is separated from the fixing clip 51, and the wrapping vinyl 100, which has been first collected, is passed through, thus second collecting the wrapping vinyl.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

LEGEND OF REFERENCE NUMBERS

1: Seed planter capable of removing soil
10: Body
11: Handle
13: Cylinder
15: Engaging ring
15a: Tightening screw
17: Second spring member
19: Through slit
20: Vertical moving member
21: Rod
23: Piston
23a: First spring member
25: Fixing pin
27: Support protrusion
29: Support member
30: Counting member
31: Wire
32: Pin member
40: Supply tube member
41: Engaging protrusion
50: Tape measure
51: Fixing clip
60: Needle member
70: Rope member
80: Shoulder band
81: Fixing hook
90: Portable water tank
91: Hose member
93: Valve
100: Wrapping vinyl
110: Seed
120: Soil furrow

The invention claimed is:
1. A seed planter capable of removing soil, comprising:
a body which has a hollow interior and is formed in a cylindrical shape, both ends of which are open, wherein a handle is detachably engaged to an upper side of the body, and a cylinder having an inner diameter expanding to accommodate wrapping vinyl and soil is provided at a lower side of the body, and an engaging ring is provided at each of the upper and lower sides of the body;

a vertical moving member which is disposed vertically movable inside the body and is elastically biased upward, wherein an upper end of the vertical moving member is exposed to an upper, outer side of the body, and a lower end thereof is accommodated in the inside of the cylinder, and the lower end thereof elastically comes and goes toward the lower outer side of the cylinder depending on the pressing on the upper end thereof;

a counting member which is installed on the body and is connected with the vertical moving member, thus counting the number that the vertical moving member vertically moves;

a supply tube member which is disposed selectively passing through the engaging ring, thus providing a selective supply of seeds, water or fertilizer, wherein the inside of the supply tube member is hollow, and the supply tube member is formed in a cylindrical shape both ends of which are open;

a tape measure which is provided at a lower side of the body and comes and goes in the direction which is horizontal with the ground; and a needle member for collecting vinyl, which is disposed spaced a predetermined distance from a side surface of the body, wherein the lower side of the needle member is fixed at the lower side of the body, and the upper side thereof is detachably fixed at the upper side of the body.

2. The planter of claim 1, wherein an edge of the cylinder is formed sharp to cut the wrapping vinyl.

3. The planter of claim 2, wherein the vertical moving member comprises:

a linear rod which is accommodated in the inside of the body;

a piston which is fixed at a lower end of the rod and has an inwardly concave groove and is accommodated inside the cylinder;

a fixing pin which protrudes downward from the lower end of the piston and first collects the wrapping vinyl which is cut by the cylinder and is passed through the fixing pin;

a support protrusion which protrudes from both front ends of the fixing pin and supports the wrapping vinyl which is passed through and first collected by the fixing pin, thus preventing the collected wrapping vinyl from separating; and a first spring member which is interposed between the piston and the cylinder and elastically biases downward the piston.

4. The planter of claim 3, wherein the counting member is connected through a wire to a pin member which is detachably engaged to the vertical moving member through a through slit formed in the longitudinal direction at the body, thus mechanically counting the number of the vertical movements with the aid of the wire which is pulled when the vertical moving member descends.

5. The planter of claim 4, wherein the needle member is disposed spaced a predetermined distance from the body to be parallel with the body, wherein the lower end of the needle member is bent toward the body and is fixedly engaged, and the upper end thereof is selectively engaged to or separates from a fixing clip disposed at the body, and the top of the needle member is formed sharp for the wrapping vinyl to pass through, thus collecting the wrapping vinyl which has been collected in the fixing pin.

6. The planter of claim 5, wherein a support member is provided on the vertical moving member which is exposed to an upper outer side of the body, and a second spring member is interposed between the upper end surface of the body and the lower end surface of the support member for elastically biasing upward the vertical moving member.

7. The planter of claim 6, wherein at the vertical moving member which is exposed to the upper outer side, there is provided a rope member so as to fix the descended state of the vertical moving member.

8. The planter of claim 1, wherein a hose member of a portable water tank that a worker can wear on his back is connected to the top of the supply tube member, thus supplying water through the hose member depending on the control of a valve.

* * * * *